(12) United States Patent
Kato et al.

(10) Patent No.: US 9,163,116 B2
(45) Date of Patent: Oct. 20, 2015

(54) POLYCARBONATE RESIN COMPOSITION

(75) Inventors: Noriyuki Kato, Tokyo (JP); Hiroki Furuhashi, Tokyo (JP); Shu Yoshida, Tokyo (JP); Kazuaki Kaneko, Tokyo (JP); Keiichi Kameyama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 508 days.

(21) Appl. No.: 13/383,734

(22) PCT Filed: Jul. 12, 2010

(86) PCT No.: PCT/JP2010/061745
§ 371 (c)(1),
(2), (4) Date: Mar. 20, 2012

(87) PCT Pub. No.: WO2011/007744
PCT Pub. Date: Jan. 20, 2011

(65) Prior Publication Data
US 2012/0178886 A1    Jul. 12, 2012

(30) Foreign Application Priority Data

Jul. 13, 2009    (JP) .................................. 2009-164989

(51) Int. Cl.
*C08L 69/00* (2006.01)
*C08G 64/16* (2006.01)

(52) U.S. Cl.
CPC .............. *C08G 64/1608* (2013.01); *C08L 69/00* (2013.01); *C08L 2205/02* (2013.01)

(58) Field of Classification Search
None
See application file for complete search history.

(56) References Cited

U.S. PATENT DOCUMENTS

| 5,486,577 | A | 1/1996 | Farah et al. |
| 6,355,768 | B1 | 3/2002 | Fujimori et al. |
| 2004/0245511 | A1 | 12/2004 | Fujimori et al. |

FOREIGN PATENT DOCUMENTS

| CN | 1572836 A | 2/2005 |
| JP | 7 26132 | 1/1995 |
| JP | 2000 169573 | 6/2000 |
| JP | 2000169573 | * 6/2000 |
| JP | 2004-67990 | 3/2004 |
| JP | 2004 359900 | 12/2004 |
| JP | 2005 25149 | 1/2005 |
| JP | 2005 68256 | 3/2005 |
| JP | 2005 89634 | 4/2005 |
| JP | 2005232256 | * 9/2005 |
| TW | 200911877 A | 3/2009 |

OTHER PUBLICATIONS

Combined Office Action and Search report issued Jan. 24, 2013 in Chinese Patent Application No. 201080031425.9 with English language translation and English translation of categories of cited documents.

U.S. Appl. No. 13/263,021, filed Dec. 20, 2011, Yoshida, et al.
International Preliminary Report on Patentability of Chapter I and Written Opinion with English translation issued Jan. 26, 2012, in PCT/JP2010/061745 filed Jul. 12, 2010.
Extended European Search Report issued Dec. 20, 2012 in Patent Application No. 10799802.3.
U.S. Appl. No. 13/390,190, filed Feb. 13, 2012, Kato et al.
International Search Report Issued Sep. 7, 2010 in PCT/JP10/61745 Filed Jul. 12, 2010.

* cited by examiner

*Primary Examiner* — David Buttner
(74) *Attorney, Agent, or Firm* — Oblon, McClelland, Maier & Neustadt, L.L.P.

(57) ABSTRACT

To provide a polycarbonate resin composition excellent in low-birefringence and strength.
Disclosed is a polycarbonate resin composition prepared by blending a polycarbonate resin (A) prepared by forming carbonate bonds in a 95-5% by mole of dihydroxy compound represented by formula (1) and a 5-95% by mole of dihydroxy compound represented by formula (2) with a diester carbonate, and a polycarbonate resin (B) prepared by forming carbonate bonds in dihydroxy compound represented by formula (3) with a diester carbonate or phosgene in a 45-85% ratio by weight of $(100\times(A))/((A)+(B))$.

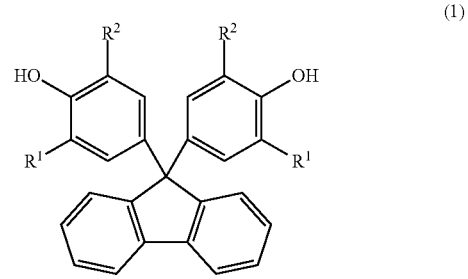

(1)

(in the formula, $R^1$ and $R^2$ represent a hydrogen atom or methyl respectively.)

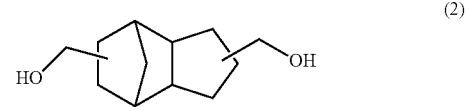

(2)

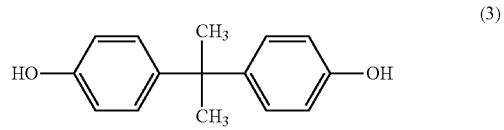

(3)

20 Claims, No Drawings

POLYCARBONATE RESIN COMPOSITION

TECHNICAL FIELD

The present invention relates to a polycarbonate resin composition prepared by blending a polycarbonate resin derived from a prescribed hydroxy compound and a polycarbonate resin derived from 2,2-bis(4-hydroxyphenyl)propane, which is excellent in formability, strength and low-birefringence.

BACKGROUND ART

Polycarbonate resins formed of 2,2-bis(4-hydroxyphenyl)propane (popular name: bisphenol A) have been used in various optical material applications such as substrates of CD or DVD, optical films, optical sheets, a wide variety of lenses, or prisms since they are excellent in transparency, heat resistance, low water-absorption properties, chemical resistance, mechanical characteristics, and dimension stability. However, the resins formed of bisphenol A have large birefringence, and it is difficult to use them in the technical fields requiring low-birefringence.

Therefore, in the technical fields requiring low-birefringence, acrylic resins, noncrystalline polyolefins, or polycarbonate resins having a specific structure have been used. However, acrylic resins suffer from high water-absorption properties, low dimension stability, or low chemical resistance properties; and noncrystalline polyolefins suffer from low impact resistance, low chemical resistance properties or high price. Furthermore, some of molded products formed of acrylic resins or noncrystalline polyolefins don't exhibit sufficient low-birefringence, and therefore, in the technical field requiring lower-birefringence, such resins may not be used.

Examples of the polycarbonate resin having a specific structure include copolymerization-polycarbonate resins derived from 9,9-bis(3-methyl-4-hydroxyphenyl)fluorene and tricyclo[5.2.1.0$^{2.6}$]decanedimethanol (see Patent Document 1). Although injection-molded products formed of the resins are excellent in low-birefringence, they suffer from low impact resistance strength.

Examples of the polycarbonate resin having a specific structure include also copolymerization-polycarbonate resins derived from 9,9-bis(4-(2-hydroxyethoxy)phenyl)fluorene and a prescribed hydroxy compound (see Patent Document 2); a polycarbonate resin composition containing a copolymerization-polycarbonate resin derived from 9,9-bis(4-(2-hydroxyethoxy)phenyl)fluorene and a prescribed hydroxy compound and a polycarbonate resin derived from bisphenol A in an amount has been proposed (see Patent Document 3); and the applications thereof have been also proposed (see Patent Document 4). Although these polycarbonate resins have lower birefringence compared with the polycarbonate formed of bisphenol A, they suffer from low strength.

Therefore, low-birefringent polycarbonate resins excellent in strength are required.

PRIOR ART DOCUMENTS

Patent Documents

[Patent Document 1] JP-A-2000-169573
[Patent Document 2] JP-A-2004-067990
[Patent Document 3] JP-A-2004-359900
[Patent Document 4] JP-A-2005-025149

DISCLOSURE OF THE INVENTION

Problems to be Solved by the Invention

One object of the present invention is to solve the above-described problems, and to provide a transparent polycarbonate resin having high strength and low birefringence.

Means of Solving the Problems

The present inventors conducted studies in order to solve the above-described problems, and, as a result, found that the problems could be solved by a polycarbonate resin composition prepared by blending
a polycarbonate resin (A) prepared by forming carbonate bonds in a 95-5% by mole of dihydroxy compound represented by formula (1) and a 5-95% by mole of dihydroxy compound represented by formula (2) with a diester carbonate, and
a polycarbonate resin (B) prepared by forming carbonate bonds in dihydroxy compound represented by formula (3) with a diester carbonate or phosgene
in a 45-85% ratio by weight of (100×(A))/((A)+(B)); and then the present invention was made.

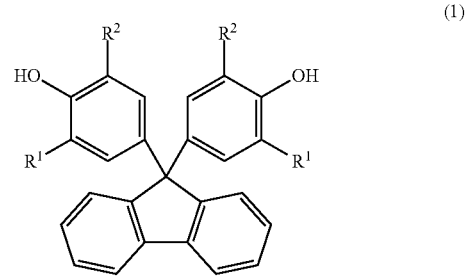

(In the formula, R$^1$ and R$^2$ represent a hydrogen atom or methyl respectively.)

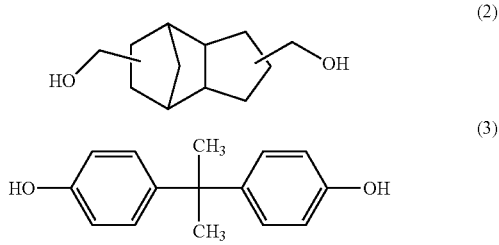

Effect of the Invention

According to the invention, it is possible to obtain a polycarbonate resin composition excellent in low-birefringence and strength. The polycarbonate resin composition is very useful since they can be used various applications including not only transparent protective sheet of a polarizing plate but also a wide variety of lenses, pickup lenses, prisms, optical sheets, optical films, light guide plates and the like.

MODE FOR CARRYING OUT THE INVENTION

The present invention relates to a polycarbonate resin composition prepared by blending a prescribed polycarbonate (A) and a prescribed polycarbonate (B) in a prescribed ratio.

The polycarbonate resin (A) is a polycarbonate resin which is prepared by forming carbonate bonds in a 95-5% by mole of dihydroxy compound represented by formula (1) and a 5-95% by mole of dihydroxy compound represented by formula (2) with a diester carbonate.

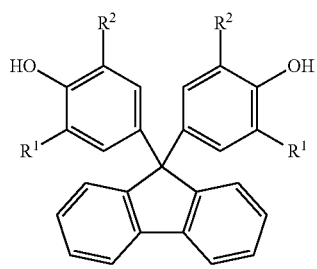

(1)

In the formula, $R^1$ and $R^2$ represent a hydrogen atom or methyl respectively.

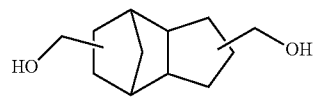

(2)

Examples of the compound represented by formula (1) include 9,9-bis(4-hydroxyphenyl)fluorene, 9,9-bis(4-hydroxy-3-methylphenyl)fluorene, 9,9-bis(4-hydroxy-3-ethylphenyl)fluorene and 9,9-bis(4-hydroxy-2,6-dimethyl phenyl)fluorene. Among these, 9,9-bis(4-hydroxy-3-methylphenyl)fluorene is preferably used.

The compound represented by formula (2) is concretely tricyclo[5.2.1.0$^{2,6}$ decanedimethanol.

The dihydroxy compounds constituting the polycarbonate (A) are the dihydroxy compound represented by formula (1) and the dihydroxy compound represented by formula (2). Regarding the ratios thereof, the ratio of the dihydroxy compound represented by formula (1) is from 5 to 95% by mole, and the ratio of the compound represented by formula (2) is from 95 to 5% by mole. Preferably, the ratio of the dihydroxy compound represented by formula (1) is from 10 to 70% by mole, and the ratio of the compound represented by formula (2) is from 90 to 30% by mole. More preferably, the ratio of the dihydroxy compound represented by formula (1) is from 15 to 60% by mole, and the ratio of the compound represented by formula (2) is from 85 to 40% by mole. Even more preferably, the ratio of the dihydroxy compound represented by formula (1) is from 25 to 45% by mole, and the ratio of the compound represented by formula (2) is from 75 to 55% by mole. The resin composition wherein the ratio of the compound represented by formula (1) is less than 5% by mole may have a low glass transition point and lowered heat resistance, which is not preferable. The resin composition wherein the ratio of the compound represented by formula (1) is more than 95% by mole may have a high glass transition point and lowered flowability during molding, which is not preferable.

The polycarbonate resin (A) may be prepared by polymerization of a dihydroxy compound represented by formula (1) and a dihydroxy compound represented by formula (2) in a presence of a diester carbonate and catalyst according to any known melt-polycondensation method. The production method will be described in detail later. The polycarbonate resin (A) may have a random, block or alternative copolymerization structure.

It is to be noted that the polycarbonate resin (A) contains only the units derived from the hydroxy compound represented by formula (1), the hydroxy compound represented by formula (2) and a diester carbonate, and contains essentially no unit derived from any monomer other than them.

The polycarbonate resin (B) is a polycarbonate resin prepared by forming carbonate bonds in the dihydroxy compound represented by formula (3), or 2,2-bis(4-hydroxyphenyl)propane (popular name: bisphenol A), with a diester carbonate or phosgene.

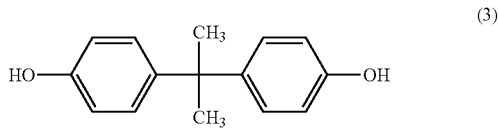 [SMILES: CC(C)(c1ccc(O)cc1)c1ccc(O)cc1]

(3)

The polycarbonate resin (B) is preferably, but is not limited to, a homopolymer formed of bisphenol A. Any bisphenol other than bisphenol A may be copolymerized with a bisphenol A in a small amount so far as the properties are not lowered.

The polycarbonate resin (B) may be prepared by polymerization of a dihydroxy compound represented by formula (3) according to any known melt-polycondensation or phosgene method (interfacial polymerization method). The production method will be described in detail later.

According to the invention, the blend ratio by weight of the polycarbonate resins (A) and (B) $(100 \times (A))/((A)+(B))$ is from 45 to 85% by weight. Preferably, the ratio is from 50 to 80% by weight. The resin composition wherein the blend ratio is less than 45% by weight may not have low birefringence, which is not preferable. The resin composition wherein the blend ratio is more than 85% by weight may have low strength, which is not preferable.

The polycarbonate resin composition of the invention may contain plural types of the polycarbonate resins (A) and (B) respectively. In such a case, the values of (A) and (B) in the formula of $(100 \times (A))/((A)+(B))$ mean the total weights of the plural types of the polycarbonate resins (A) and (B) respectively.

The polystyrene-converted weight average molecular weight (Mw) of the polycarbonate resin (A) is from 20,000 to 300,000, or preferably from 35,000 to 150,000. The blended resin composition containing the polycarbonate resin (A) whose Mw is smaller than 20,000 may be brittle, which is not preferable. The polycarbonate resin composition containing the polycarbonate resin (A) whose Mw is more than 300,000 has a high melt viscosity, which may require undesirable severer conditions for being blended. Furthermore, such a resin composition may be subjected to an injection molding under severer conditions, which may cause undesirable silver patterns in the molded products.

The polystyrene-converted weight average molecular weight (Mw) of the polycarbonate resin (B) is from 15,000 to 250,000, or preferably from 20,000 to 110,000. The blended resin composition containing the polycarbonate resin (B) whose Mw is smaller than 15,000 may be brittle, which is not preferable. The polycarbonate resin composition containing the polycarbonate resin (B) whose Mw is more than 250,000 has a high melt viscosity, which may require severer conditions for being blended. Furthermore, such a resin composition may be subjected to an injection molding under severer conditions, which may cause undesirable silver patterns in the molded products.

The difference (ΔMw) of polystyrene-converted weight average molecular weight (Mw) between the polycarbonate resins (A) and (B) is preferably from 0 to 120,000, or more preferably from 0 to 80,000. The polycarbonate resins (A) and (B), whose ΔMw is more than 12,000, may show a remarkably big difference in viscosity therebetween, and may be compatible hardly. Therefore, the resin composition, containing such the polycarbonate resins, may show lowered transparency, which is not preferable.

The polystyrene-converted weight average molecular weight (Mw) of the resin composition of the present invention prepared by blending the polycarbonate resins (A) and (B) is preferably from 10,000 to 80,000, or more preferably from 25,000 to 60,000. The resin composition having the molecular weight falling within the above-described scope may have good formability, which is preferable.

The glass-transition temperature (Tg) of the polycarbonate resin composition of the invention is preferably from 95 to 180 degrees Celsius, or more preferably from 105 to 170 degrees Celsius. The composition, having Tg of lower than 95 degrees Celsius, may be used in only a narrow temperature range, which is not preferable. The composition, having Tg of higher than 180 degrees Celsius, may have to be subjected to a molded process under severer conditions, which is not preferable.

Next, examples of the method for preparing the polycarbonate resin (A) will be described in detail.

The polycarbonate resin (A) may be prepared by polymerization of dihydroxy compounds represented by formulas (1) and (2) in a presence of a diester carbonate and catalyst according to any known melt-polycondensation method.

As the diester carbonate, diphenyl carbonate, ditolyl carbonate, bis(chlorophenyl)carbonate, m-crezyl carbonate, dimethyl carbonate, diethyl carbonate, dibutyl carbonate, dicyclohexyl carbonate and the like are exemplified. Among these, diphenyl carbonate is preferable. The diester carbonate is preferably used by a ratio of from 0.98 to 1.20 moles, or more preferably by a ratio of from 0.99 to 1.10 moles, with respect to 1 mole of the total of the dihydroxy compounds.

As the basic-compound catalyst, alkali metal, alkali earth metal compounds, nitrogen-containing compounds and the like are especially exemplified.

Specific examples thereof include organic acid salts, inorganic acid salts, oxides, hydroxides, hydrides, and alkoxides of alkali metal and/or alkali earth metal compounds; and quaternary ammonium hydroxides and the salts thereof, and amines. They may be used alone respectively or in combination thereof.

As the alkali metal compound, sodium hydroxide, potassium hydroxide, cesium hydroxide, lithium hydroxide, sodium hydrogen carbonate, potassium hydrogen carbonate, cesium hydrogen carbonate, lithium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium boron phenylated, sodium benzoate, potassium benzoate, cesium benzoate, lithium benzoate, disodium hydrogen phosphate, dipotassium hydrogen phosphate, dilithium hydrogen phosphate, disodium phenylphosphate, disodium-, dipotassium-, dicesium- and dilithium-salts of bisphenol A, sodium-, potassium-, cesium- and lithium-salts of phenol, or the like are used.

As the alkali earth metal compound, specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate or the like are used.

As the nitrogen-containing compound, specifically, quaternary ammonium hydroxides having an alkyl or aryl group such as tetramethyl ammonium hydroxide, tetraethyl ammonium hydroxide, tetrapropyl ammonium hydroxide, tetrabutyl ammonium hydroxide and trimethylbenzyl ammonium hydroxide, tertiary amines such as triethylamine, dimethylbenzylamine and triphenylamine, secondary amines such as diethylamine and dibutylamine, primary amines such as propylamino and butyl amine, imidazoles such as 2-methylimidazole and 2-phenylimidazole and benzimidazole, bases and basic salts such as ammonia, tetramethyl ammonium borohydride, tetrabutyl ammonium borohydride, tetrabutyl ammonium tetraphenylborate, tetraphenyl ammonium tetraphenylborate, or the like are used.

As the transesterification catalyst, salts of zinc, tin, zirconium or lead are preferably used, and may be used alone respectively or in combination thereof.

Specifically, zinc acetate, zinc benzoate, zinc 2-ethylhexanoate, thin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate or the like is used.

These catalysts may be respectively used preferably by a ratio of from $10^{-9}$ to $10^{-3}$ mole, or more preferably by a ratio of from $10^{-7}$ to $10^{-4}$ mole, with respect to 1 mole of the total dihydroxy compounds.

According to the invention, in a melt-polycondensation method, the above-described raw materials and catalyst are used, and the melt-polycondensation is carried out by interesterification reaction thereof under heat and under an ordinary or reduced pressure while the by-products are removed. The reaction is usually carried out in two or more multiple-stage step.

Specifically, the reaction in the first stage is carried out at a temperature of from 120 to 260 degrees Celsius, or preferably at a temperature of from 180 to 240 degrees Celsius, for from 0.1 to 5 hours, or preferably for from 0.5 to 3 hours. Next, the reaction of the dihydroxy compounds with a diester carbonate is continuously carried out while, for from 0.3 to 10 hours, the temperature is gradually raised to a final temperature of from 200 to 250 degrees Celsius and the pressure is gradually reduced to a final pressure of equal to or less than 1 Torr. Such a reaction may be carried out in a continuous or batch method. The reaction device to be used may be any vertical type equipped with an anchor agitating impeller maxblend agitating impeller, helical ribbon agitating impeller or the like, any horizontal type equipped with a paddle agitating impeller, grid agitating impeller, glass agitating impeller or the like, or any extruder type equipped with a screw. And they may be used in combination considering the viscosity of the polymerized product After the completion of the polymerization reaction, the catalyst is removed or deactivated in order to maintain heat stability and hydrolysis stability of the polycarbonate resin thus obtained. Usually, a method for deactivating a catalyst by addition of known acid substance is suitably applied. Preferable examples of the acid substance include esters including butyl benzoate and dodencyl benzoate, aromatic sulfonic acids including p-toluene sulfonic acid and dodecylbenzene sulfonic acid, aromatic sulfonic acid esters including butyl p-toluene-sulfonate, hexyl p-toluenesulfonate, octyl p-toluenesulfonate, phenyl p-toluenesulfonate and phenethyl p-toluenesulfonate, phosphoric acids including phosphorous acid, phosphoric acid and phosphonic acid, phosphites including triphenyl phosphite, monophenyl phosphite, diphenyl phosphite, monoethyl phosphite, diethyl phosphite, di-n-propyl phosphite, di-n-butyl phosphite, mono-n-butyl phosphite, di-n-hexyl phosphite, dioctyl phosphite and monooctyl phosphite, phosphates including triphenyl phosphate, diphenyl phosphate, monophenyl phosphate, monoethyl phosphate, diethyl phosphate, monobutyl phosphate, dibutyl phosphate, dioctyl phosphate and monoctyl phosphate, phosphonic acids including diphenyl phosphonic acid, dioctyl phosphonic acid and dibutyl phosphonic acid, phosphonates including diethyl phenyl phosphonate, phosphines including triphenyl phosphine and bis(diphenyl-phosphino)ethane, boric acids including boric acid and phenyl boric acid, aromatic sulfonic acid salts including dodecylbenzene sulfonic acid tetrabutyl phosphonium salt, organic halides including benzoyl chloride and p-toluene-sulfonyl chloride, alkyl sulfates including dimethyl sulfate and organic halides including benzyl chloride.

After the deactivation of the catalyst, a step to remove low boiling point compounds in the polymer with vaporization under a pressure of 0.1 to 1 mmHg at a temperature of 200 to 350 degrees Celsius may be added. For its purpose, a horizontal apparatus equipped with a stirring impeller with excellent surface renewing capacity such as paddle impeller, lattice impeller, spectacle shaped impeller, etc. or thin film vaporizer is suitably used.

Next, the method for preparing the polycarbonate resin (B) will be described in detail.

One example of the method for preparing the polycarbonate resin (B) is a method in which a dihydroxy compound and a diester carbonate are subjected to a melt-polycondensation in a presence of a basic compound catalyst. This method is carried out almost based on the method of producing the polycarbonate resin (A). However, in the production method of the polycarbonate resin (B), using no transition metal-type interesterification catalyst is preferable.

Another example of the method for preparing the polycarbonate resin (B) is a method in which a dihydroxy compound is subjected to an interfacial polymerization with phosgene in a presence of solvent, an end-stopping agent and an acid-binding agent. In the method, generally, the dihydroxy compound and the end-stopping agent are dissolved in an aqueous solution of the acid-binding agent, and the reaction is carried out in a presence of organic solvent.

As the acid-binding agent, for example, pyridine, or hydroxides of alkali metal such as sodium hydroxide and potassium hydroxide are preferably used. And as the solvent, for example, methylene chloride, chloroform, chlorobenzene, xylene or the like is preferably used. Furthermore, for promoting the polymerization, as a catalyst, tertiary amines such as triethyl amine, or quaternary ammonium salts such as tetra n-butyl ammonium bromide are used.

As the end-stopping agent which is used for adjusting the polymerization degree, mono-functional hydroxy compounds such as phenol, p-tert-butylphenol, p-cumylphenol and phenols having a long alkyl group are used.

Furthermore, if desired, a small amount of an antioxidant such as sodium sulfite and sodium hydrosulfite may be added.

The reaction is usually carried out at a temperature of from 0 to 150 degrees Celsius, or preferably at a temperature of from 5 to 40 degrees Celsius. The reaction time depends on the reaction temperature, and, the reaction time is usually from 0.5 min. to 10 hours, or preferably from 1 min. to 2 hours. And it is preferable that the pH value of the reaction system is kept equal to or more than 10 during the reaction The method for producing the polycarbonate resin composition of the invention is not limited, and it may be produced according to any one of

[1] a method in which solids of polycarbonate resins (A) and (B) are blended and then kneaded in a kneading machine;

[2] a method in which a solid of the polycarbonate resin (B) is added to the polycarbonate resin (A) in a molten state and then kneaded;

[3] a method in which a solid of the polycarbonate resin (A) is added to the polycarbonate resin (B) in a molten state and then kneaded; and

[4] a method in which polycarbonate resins (A) and (B) are blended in a molten state and then kneaded. Kneading may be performed in a continuous process or in a batch wise. When kneading is performed in a continuous process, an extruder is suitably applied. When kneading is performed in a batch wise, a labopastomill or a kneader is suitably applied. When any polycarbonate resin produced by a melt-polycondensation process is used, it is preferable to perform kneading after deactivation of a catalyst in terms of avoiding transesterfication during kneading. A catalyst deactivator may be kneaded together with the resins to be blend or may be kneaded after blending. In such case, the range in which chemical resistance of the resin composition is not impaired by random change due to transesterification reaction should be maintained.

As another process for producing the polycarbonate resin composition of the present invention, also a process comprising dissolving the polycarbonate resins (A) and (B) in a solvent and pouring it into a mold and then vaporizing the solvent may be applied. As the solvent, methylene chloride, chloroform and cresol are used. According to the process, it is possible to dissolve and add any additive at the same time.

If necessary, antioxidant, a releasing agent, an ultraviolet absorber, a flowability improving agent, a reinforcing agent, crystalline nucleus agent, dye, an antistatic agent, and an antibacterial agent may be added to the polycarbonate resin composition of the present invention. These additives may be added to each the resins (A) and (B) or either one thereof prior to blending and kneading or may be added and kneaded at the same time during blending and kneading or may be kneaded after blending.

However, it is preferable that the polycarbonate resin composition of the invention substantially contains no polycarbonate resin other than the polycarbonate resins (A) and (B).

The polycarbonate resin composition of the present invention has low birefringence, and is very useful since they can be used various applications including not only transparent protective sheet of a polarizing plate but also a wide variety of lenses, pickup lenses, prisms, optical sheets, optical films, light guide plates and the like. Materials to be used for such an optical member are usually required to have birefringence of not larger than 700 nm and to have bending strength of not smaller than 60 MPa in terms of processing suitability and durability. The polycarbonate resin composition of the present invention may satisfy these properties.

EXAMPLES

The present invention will be illustrated in further detail with reference to several examples below, which are not intended to limit the scope of the present invention. The evaluations of the obtained polycarbonate resin compositions were carried out according to the following methods or the following apparatus.

1) Polystyrene-converted weight average molecular weight (Mw): Using GPC, a standard curve was prepared with polystyrene standard samples of which molecular weight (the distribution of molecular weight=1) were known by using chloroform as a developing solvent. On the basis of the standard curve, the value was calculated from the retention times
2) Glass transition temperature (Tg): Using a differential scanning calorimeter (SSC-5200 manufactured by Seiko Instruments), DSC measurements were carried out at the rate of 10 degrees Celsius/min.
3) Bending elastic modulus: After the pellet of the polycarbonate resin was dried at 120 degrees Celsius for 24 hours, the test piece was prepared by subjecting the pellet to an injection forming with an injection machine, "SG-150" manufactured by Sumitomo Heavy Industries, Ltd., at a cylinder temperature of 255 degrees Celsius, and was subjected to a measurement according to ASTM-D0790.
4) Birefringent index: Birefringence (retardation) was measured according to the following method.
4-1) Preparation of Cast Film Each of the resins obtained according to the following examples was dissolved in dichloromethane to give a solution having 5% by weight concentration, and the solution was cast on a cast plate which was confirmed the horizontality. Dichloromethane was vaporized while the vaporizing amount was adjusted by occasionally covering the cast plate, and a resin film having a thickness of 100 micro meters was obtained.
4-2) Stretching of Film The film was cut into a piece of 5 cm×5 cm, and was stretched at a temperature of higher than the glass transition temperature (Tg) by 10 degrees Celsius at a stretching ratio of one and half times.
4-3) Measurement of Birefringence Birefringence (retardation) of the obtained stretched film was measured at a wavelength of 633 nm by using an ellipsometer, manufactured by k.k., Mizojiri Kogaku Kogyo.

Example 1

In a 50 L-reactor vessel equipped with an agitating instrument and a distillation apparatus, 8.14 kg (21.5 moles (33.6% by mole)) of 9,9-bis(4-hydroxy-3-methylphenyl)fluorene, 8.32 g (42.4 moles (66.4% by mole)) of tricyclo[$5.2.1.0^{2.6}$] decanedimethanol, 13.81 g (64.5 moles) of diphenyl carbonate and $5\times10^{-5}$ g ($6\times10^{-7}$ moles) of sodium hydrogen carbonate were placed, and heated to 215 degrees Celsius at 760 Torr under a nitrogen gas-atmosphere for an hour under stirring.

After that, the pressure was reduced to 150 Torr for 15 minutes, and then, the interesterification reaction was carried out at 215 degrees Celsius at 150 Torr for 20 minutes. Furthermore, the temperature was raised to 240 degrees Celsius at 37.5 degrees Celsius/hr, and then maintained at 240 degrees Celsius for at 150 Torr 10 minutes. After that, the pressure was reduced to 120 Torr for 10 minutes, and then maintained at 240 degrees Celsius at 120 Torr for 70 minutes. After that, the pressure was reduced to 100 Torr for 10 minutes, and then maintained at 240 degrees Celsius at 100 Torr for 10 minutes. The pressure was reduced to 1 Torr or less for 40 minutes, and then the polymerization was carried out at 240 degrees Celsius at a pressure of equal to or less than 1 Torr for 25 minutes under stirring. After termination of the reaction, nitrogen gas was blown into the vessel for pressurizing, and then the produced polycarbonate resin was taken out while being subjected to pelletization. Polycarbonate resin having Mw of 62300 and Tg of 142 degrees Celsius was obtained.

10.0 kg of the obtained polycarbonate was dried in vacuum at 100 degrees Celsius for 24 hours, added with diethyl phosphite in an amount of 10 times by mole with respect to the amount of sodium hydrogen carbonate in the resin, and glycerin monostearate in an amount of 300 ppm with respect to the resin, mixed and kneaded with them by using an extruder at 260 degrees Celsius, and then pelletized. In this way, pellets (A) were obtained. The Mw of the pellet was 62,100.

8 kg of the obtained pellets and 2 kg of pellets of a polycarbonate resin formed of bisphenol A, "lupilon S-3000" (manufactured by Mitsubishi Engineering-Plastics Corporation; Mw: 47800), were sufficiently mixed while being shaken, and were kneaded at 260 degrees Celsius in an extruder; and 6.8 kg of pelletized and blended pellets were obtained. The pellets had Tg of 140 degrees Celsius, and any inflection point was not found. From the result, that the blended ingredients were blended each other completely was confirmed. The Mw thereof was 58940. The bending strength and birefringence thereof were measured, and it was found that birefringence thereof was low, 250 nm, and that the bending strength thereof was high, 79 MPa.

Example 2

The steps were carried out in the same manner as Example 1, except that 6 kg of the polycarbonate resin pellets (A) and 4 kg of pellets of a polycarbonate resin formed of bisphenol A, "lupilon S-3000", were blended and kneaded. The Mw thereof was 55600. The bending strength and birefringence thereof were measured, and it was found that birefringence thereof was low, 440 nm, and that the bending strength thereof was high, 83 MPa.

Example 3

The steps were carried out in the same manner as Example 1, except that 5 kg of the polycarbonate resin pellets (A) and 5 kg of pellets of a polycarbonate resin formed of bisphenol A, "lupilon S-3000", were blended and kneaded. The Mw thereof was 54000. The bending strength and birefringence thereof were measured, and it was found that birefringence thereof was low, 670 nm, and that the bending strength thereof was high, 86 MPa.

Example 4

The polymerization was carried out in the same manner as Example 1, except that 6.05 kg (16.0 moles (25.0% by mole)) of 9,9-bis(4-hydroxy-3-methylphenyl)fluorene, 9.41 kg (47.93 moles (75.0% by mole)) of tricyclo[$5.2.1.0^{2.6}$]decanedimethanol, 13.81 g (64.5 moles) of diphenyl carbonate and $5\times10^{-5}$ g ($6\times10^{-7}$ moles) of sodium hydrogen carbonate were used, and polycarbonate resin pellets were obtained. The Mw of the polycarbonate resin was 65300, and Tg thereof was 116 degrees Celsius.

10.0 kg of the obtained polycarbonate was dried in vacuum at 100 degrees Celsius for 24 hours, added with diethyl phosphite in an amount of 10 times by mole with respect to the amount of sodium hydrogen carbonate in the resin, and glycerin monostearate in an amount of 300 ppm with respect to the resin, mixed and kneaded with them by using an extruder at 260 degrees Celsius, and then pelletized. In this way, pellets (A) were obtained. The Mw of the pellet was 64,100.

5 kg of the obtained pellets and 5 kg of pellets of a polycarbonate resin formed of bisphenol A, "lupilon S-3000" (manufactured by Mitsubishi Engineering-Plastics Corporation; Mw: 47800), were sufficiently mixed while being shaken, and were kneaded at 260 degrees Celsius in an extruder; and 6.8 kg of pelletized and blended pellets were obtained. The pellets had Tg of 130 degrees Celsius, and any inflection point was not found. From the result, that the blended ingredients were blended each other completely was confirmed. The Mw thereof was 52000. The bending strength and birefringence thereof were measured, and it was found that birefringence thereof was low, 680 nm, and that the bending strength thereof was high, 78 MPa.

Comparative Example 1

The polymerization was carried out in the same manner as Example 1. The obtained resin was added with diethyl phosphite in an amount of 10 times by mole with respect to the amount of sodium hydrogen carbonate in the resin, and glycerin monostearate in an amount of 300 ppm with respect to the resin, and mixed and kneaded with them by using an extruder at 260 degrees Celsius. The bending strength and birefringence of the obtained polycarbonate resin were measured, and it was found that birefringence thereof was very low, 1 nm, but the bending strength thereof was low, 11 MPa.

Comparative Example 2

The steps were carried out in the same manner as Example 1, except that 9 kg of the polycarbonate resin pellets (A) and 1 kg of pellets of a polycarbonate resin formed of bisphenol A, "lupilon S-3000", were blended and kneaded. The Mw thereof was 60600. The bending strength and birefringence thereof were measured, and it was found that birefringence thereof was very low, 15 nm, but the bending strength thereof was low, 15 MPa.

Comparative Example 3

The steps were carried out in the same manner as Example 1, except that 6 kg of the polycarbonate resin pellets (A) and 4 kg of pellets of a polycarbonate resin formed of bisphenol A, "lupilon S-3000", were blended and kneaded. The Mw thereof was 52000. The bending strength and birefringence thereof were measured, and it was found that the bending strength thereof was high, 90 MPa, but birefringence thereof was large, 1010 nm.

TABLE 1

| | Polymer (A) (1)/(2) ratio by mole | Blend Ratio (A)/(B) | Bending strength MPa | Birefringence nm | Mw |
|---|---|---|---|---|---|
| Example 1 | 33.6/66.4 | 80/20 | 79 | 250 | 58940 |
| Example 2 | 33.6/66.4 | 60/40 | 83 | 440 | 55600 |
| Example 3 | 33.6/66.4 | 50/50 | 86 | 670 | 54000 |
| Example 4 | 25/75 | 50/50 | 78 | 680 | 52000 |
| Comparative Example 1 | 33.6/66.4 | 100/0 | 11 | 1 | 62300 |
| Comparative Example 2 | 33.6/66.4 | 90/10 | 15 | 15 | 60600 |
| Comparative Example 3 | 33.6/66.4 | 40/60 | 90 | 1010 | 52000 |

REFERENTIAL EXAMPLE

The polymerization was carried out in the same manner as Example 1, except that 12.10 kg (32.0 moles (50.0% by mole)) of 9,9-bis(4-hydroxy-3-methylphenyl)fluorene, 6.28 kg (32.0 moles (50.0% by mole)) of tricyclo[5.2.1.0$^{2,6}$]decanedimethanol, 13.81 g (64.5 moles) of diphenyl carbonate and 5×10$^{-5}$ g (6×10$^{-7}$ moles) of sodium hydrogen carbonate were used, and polycarbonate resin pellets were obtained. The Mw of the polycarbonate resin was 61300, and Tg thereof was 133 degrees Celsius.

10.0 kg of the obtained polycarbonate was dried in vacuum at 100 degrees Celsius for 24 hours, added with diethyl phosphite in an amount of 10 times by mole with respect to the amount of sodium hydrogen carbonate in the resin, and glycerin monostearate in an amount of 300 ppm with respect to the resin, mixed and kneaded with them by using an extruder at 260 degrees Celsius, and then pelletized. In this way, pellets (A) were obtained. The Mw of the pellet was 60100.

5 kg of the obtained pellets and 5 kg of pellets of a polycarbonate resin formed of bisphenol A, "lupilon S-3000" (manufactured by Mitsubishi Engineering-Plastics Corporation; Mw: 47800), were sufficiently mixed while being shaken, and were kneaded at 260 degrees Celsius in an extruder; and 6.8 kg of pelletized and blended pellets were obtained. The pellets had Tg of 140 degrees Celsius, and any inflection point was not found. From the result, that the blended ingredients were blended each other completely was confirmed.

The Mw thereof was 53000. The bending strength and birefringence thereof were measured, and it was found that birefringence thereof was as small (680 nm) as those of Examples 1-4 but the bending strength thereof was inferior (10 MPa) compared with Examples 1-4. Namely, it was found that, regarding the ratio by mole of the dihydroxy compound represented by formula (1) and the compound represented by formula (2) in the polycarbonate resin A, the former was preferably 15-60% by mole and the latter was preferably 85-40% by mole in terms of the bending strength.

The invention claimed is:

1. A polycarbonate resin composition, comprising:

a polycarbonate resin (A); and a polycarbonate resin (B), wherein the polycarbonate resin (A) and the polycarbonate resin (B) are blended in a 45-85% ratio by weight of (100×(A))/((A)+(B)), the polycarbonate resin (A) is obtained by reacting 25 to 33.6% by mole of a dihydroxy compound represented by formula (1):

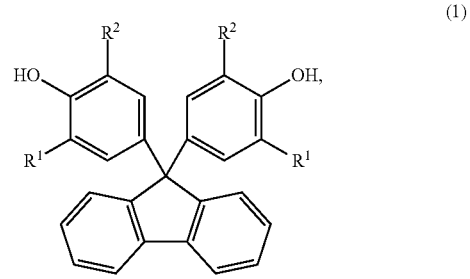

wherein $R^1$ and $R^2$ individually represent a hydrogen atom or a methyl, and 75 to 66.4% by mole of a dihydroxy compound represented by formula (2):

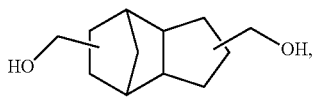

with a diester carbonate to form carbonate bonds; and
the polycarbonate resin (B) is obtained by reacting a dihydroxy compound represented by formula (3):

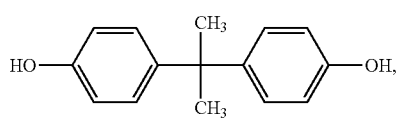

with the diester carbonate or phosgene to form carbonate bonds.

2. The polycarbonate resin composition of claim 1, wherein $R^1$ in formula (1) is a hydrogen atom.

3. The polycarbonate resin composition of claim 2, wherein the polycarbonate resins (A) and (B) are blended in a 50-80% ratio by weight of $(100\times(A))/((A)+(B))$.

4. The polycarbonate resin composition of claim 3, wherein the diester carbonate is diphenyl carbonate.

5. The polycarbonate resin composition of claim 4, wherein when the polycarbonate resin composition is pelletized, dried at 120 degrees Celsius for 24 hours, subjected to an injection forming at a cylinder temperature of 255 degrees Celsius, and subjected to a measurement of bending elastic modulus according to ASTM-D0790, the bending elastic modulus is 78 to 86 MPa.

6. The polycarbonate resin composition of claim 1, wherein the polycarbonate resins (A) and (B) are blended in a 50-80% ratio by weight of $(100\times(A))/((A)+(B))$.

7. The polycarbonate resin of claim 1, wherein the diester carbonate is diphenyl carbonate, ditolyl carbonate, bis(chlorophenyl)carbonate, m-crezyl carbonate, dimethyl carbonate, diethyl carbonate, dibutyl carbonate or dicyclohexyl carbonate.

8. The polycarbonate resin composition of claim 1, wherein the diester carbonate is diphenyl carbonate.

9. The polycarbonate resin composition of claim 1, wherein a polystyrene-converted weight average molecular weight, Mw, of the polycarbonate resin (A) is from 20,000 to 300,000, and a polystyrene-converted weight average molecular weight, Mw, of the polycarbonate resin (B) is from 15,000 to 250,000.

10. The polycarbonate resin composition of claim 1, wherein a difference, ΔMw, of the polystyrene-converted weight average molecular weight, Mw, between the polycarbonate resin (A) and the polycarbonate resin (B) is from 0 to 120,000.

11. The polycarbonate resin composition of claim 1 having a glass transition point from 95 to 180 degrees Celsius.

12. The polycarbonate resin composition of claim 1, wherein the dihydroxy compound represented by formula (1) is 9,9-bis(4-hydroxy-2,6-dimethyl phenyl)fluorene.

13. The polycarbonate resin composition of claim 12, wherein the polycarbonate resins (A) and (B) are blended in a 50-80% ratio by weight of $(100\times(A))/((A)+(B))$.

14. The polycarbonate resin composition of claim 1, wherein when the polycarbonate resin composition is pelletized, dried at 120 degrees Celsius for 24 hours, subjected to an injection forming at a cylinder temperature of 255 degrees Celsius, and subjected to a measurement of bending elastic modulus according to ASTM-D0790, the bending elastic modulus is 78 to 86 MPa.

15. The polycarbonate resin composition of claim 14, wherein the dihydroxy compound represented by formula (1) is 9,9-bis(4-hydroxy-2,6-dimethyl phenyl)fluorene, and the diester carbonate is diphenyl carbonate.

16. The polycarbonate resin composition of claim 15, wherein the polycarbonate resins (A) and (B) are blended in a 50-60% ratio by weight of $(100\times(A))/((A)+(B))$.

17. The polycarbonate resin composition of claim 15, wherein the polycarbonate resins (A) and (B) are blended in a 50% ratio by weight of $(100\times(A))/((A)+(B))$.

18. The polycarbonate resin composition of claim 1, wherein the dihydroxy compound represented by formula (1) is 9,9-bis(4-hydroxy-2,6-dimethyl phenyl)fluorene, and the diester carbonate is diphenyl carbonate.

19. The polycarbonate resin composition of claim 18, wherein the polycarbonate resins (A) and (B) are blended in a 50-60% ratio by weight of $(100\times(A))/((A)+(B))$.

20. The polycarbonate resin composition of claim 18, wherein the polycarbonate resins (A) and (B) are blended in a 50% ratio by weight of $(100\times(A))/((A)+(B))$.

* * * * *